United States Patent
Moldvai (10) Patent No.: US 7,573,533 B2
(45) Date of Patent: Aug. 11, 2009

(54) METHOD OF GENERATING TRANSFER CURVES FOR ADAPTIVE CONTRAST ENHANCEMENT

(75) Inventor: Caba Moldvai, Dublin, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 615 days.

(21) Appl. No.: 11/044,774

(22) Filed: Jan. 26, 2005

(65) Prior Publication Data

US 2006/0082689 A1 Apr. 20, 2006

Related U.S. Application Data (60) Provisional application No. 60/619,202, filed on Oct. 15, 2004.

(51) Int. Cl.
H04N 5/52 (2006.01)
(52) U.S. Cl. .............. 348/678; 348/603; 348/673; 348/365
(58) Field of Classification Search .......... 348/678, 348/34, 353, 365, 404.1, 424.2, 603, 673, 348/686; 345/589, 601, 606, 617; 382/168–172, 382/274; H04N 5/52
See application file for complete search history.

(56) References Cited

U.S. PATENT DOCUMENTS

| | | | |
|---|---|---|---|
| 5,450,502 A | | 9/1995 | Eschbach et al. |
| 5,828,793 A * | | 10/1998 | Mann .................. 382/284 |
| 5,949,918 A * | | 9/1999 | McCaffrey ............ 382/274 |
| 6,163,621 A | | 12/2000 | Paik et al. |
| 6,239,782 B1 * | | 5/2001 | Siegel .................. 345/690 |
| 6,594,388 B1 | | 7/2003 | Gindele et al. |
| 6,650,664 B1 | | 11/2003 | Moore et al. |
| 6,738,527 B2 | | 5/2004 | Kuwata et al. |
| 6,778,183 B1 | | 8/2004 | Nair |

(Continued)

FOREIGN PATENT DOCUMENTS

EP 0 648 040 4/1995

(Continued)

OTHER PUBLICATIONS

International Search Report dated Nov. 23, 2007 from EP Application No. 05256354.1.

(Continued)

*Primary Examiner*—Trang U Tran
(74) *Attorney, Agent, or Firm*—Beyer Law Group LLP (57) ABSTRACT

Disclosed is a method for generating transfer curves for adaptive contrast enhancement. Transfer curves are generated so as to enhance the bright pixels in mostly dark images and the dark pixels in mostly bright images. For a dark image, a transfer curve is generated which increases luminance in high-luminance regions of the image without substantially changing the luminance in the mid- and low-luminance regions of the image. For a bright image, a transfer curve is generated which decreases the luminance in the dark areas of the image without substantially changing the luminance in the mid- and high-luminance regions of the image. For a medium-bright image, a transfer curve is generated with increases the luminance in the high-luminance range and decreases the luminance in the low-luminance range of the histogram without substantially changing the luminance in the medium-luminance range of the image.

11 Claims, 8 Drawing Sheets

U.S. PATENT DOCUMENTS

| | | | |
|---|---|---|---|
| 7,034,843 B2* | 4/2006 | Nair et al. .................. | 345/589 |
| 7,050,114 B2* | 5/2006 | Stessen et al. .............. | 348/679 |
| 7,127,123 B2 | 10/2006 | Wredenhagen et al. | |
| 7,221,807 B2 | 5/2007 | Campbel | |
| 2002/0101432 A1 | 8/2002 | Ohara et al. | |
| 2003/0161549 A1 | 8/2003 | Lei et al. | |
| 2004/0008903 A1 | 1/2004 | Kim | |

FOREIGN PATENT DOCUMENTS

| | | |
|---|---|---|
| EP | 0648040 | 4/1995 |
| EP | 0 366 099 | 1/1996 |
| EP | 0 772 158 | 5/1997 |
| EP | 1 418 543 | 5/2004 |

OTHER PUBLICATIONS

Chinese Office Action dated Mar. 7, 2008 from Chinese Application No. 200510124980.7.

Search Report dated May 9, 2008 in Singapore Patent Application No. 200506563-6.

Office Action dated Apr. 15, 2008 in U.S. Appl. No. 11/044,755.

Kim et al., "Image Contrast Enhancement Based On The Piecewise-Linear Approximation of CDF". Consumer Electronics, IEEE Transactions, Aug. 1999. vol. 45, Issue 3, pp. 828-834.

Yu et al., "Histogram-shape preserving algorithm for image enhancement Circuits and Systems", 1993. ISCAS '93, 1993 IEEE International Symposium on May 3-6, 1993. vol. 1 pp. 407-410.

Stark, J.A. "Adaptive Image Contrast Enhancement Using Generalizations of Histogram Equalization". Image Processing, IEEE Transactions, May 2000. vol. 9, issue 5, pp. 889-896.

Carbonaro et al., "A Comprehensive Approach to Image-Contrast Enhancement," Proceedings of the International Conference on Image Analysis and Processing, 1999, Sep. 27-29, 1999, pp. 241-246.

Australian Written Opinion dated Feb. 14, 2006 in Singapore Application No. 200506565-1.

Chinese Office Action dated Sep. 5, 2008 in Chinese Application No. 200510124980.7.

* cited by examiner

METHOD OF GENERATING TRANSFER CURVES FOR ADAPTIVE CONTRAST ENHANCEMENT

This application claims priority of U.S. provisional application No. 60/619,202 filed on Oct. 15, 2004 which is hereby incorporated by reference.

BACKGROUND OF THE INVENTION

The present invention relates generally to contrast enhancement and, more particularly, to a method for generating transfer curves for adaptive contrast enhancement.

Traditional contrast adjustment methods in displays and TVs do not take into account the input image content and result in unintended average brightness shifts as well as saturation or clipping. For example, poor results are obtained when increasing the contrast on an image that already has good contrast, and poor contrast is obtained when the image has a large portion of very bright or very dark pixels. Similarly, decreasing the contrast in a non-adaptive approach will "black out" images that already have poor contrast.

Therefore, what is desired is a contrast enhancement method that takes into account the input image content and avoids the above problems.

SUMMARY OF THE INVENTION

What is provided, therefore, is an adaptive contrast enhancement method that takes into account the content of the input image and uses transfer curves to alter pixel luminances. The method generates transfer curves that enhance the bright pixels in mostly dark images and enhance the dark pixels in mostly bright images.

For a dark image, a transfer curve is generated which increases luminance in high-luminance regions of the image without substantially changing the luminance in the mid- and low-luminance regions of the image. For a bright image, a transfer curve is generated which decreases the luminance in the dark areas of the image without substantially changing the luminance in the mid- and high-luminance regions of the image. For a medium-bright image, a transfer curve is generated with increases the luminance in the high-luminance range and decreases the luminance in the low-luminance range of the histogram without substantially changing the luminance in the medium-luminance range of the image.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to a particular embodiment of the invention examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

When a digital display device, such as a liquid crystal display (LCD) based display or a cathode-ray tube (CRT) based display, receives an input image, it is desirable to enhance the contrast of the input image before the image is displayed for viewing. Adaptive contrast enhancement refers to a general approach of analyzing the luminance spectrum of an input image and increasing or decreasing luminance in specific luminance ranges in order to enhance output image contrast. To accomplish this, first a luminance histogram is constructed for the input image by counting the number of pixels corresponding to luminance levels ranging over the input luminance range (the luminance spectrum). Then, output luminance levels are assigned according to a transfer curve, wherein a transfer curve is a mapping between input luminance levels and output luminance levels.

One approach to adaptive contrast enhancement comprises generating transfer curves that increase luminance in those image pixels that correspond to the most populated bins in the image histogram. Using this approach, bright pixels are brightened in mostly bright images, and dark pixels are brightened in mostly dark images.

A novel approach to adaptive contrast enhancement is disclosed herein. The fundamental idea is to generate transfer curves that brighten the bright pixels in mostly dark images, and darken the dark pixels in mostly bright images. This approach takes advantage of the fact that the least populated bins in the image histogram represent small image regions which are generally scattered and statistically distributed over the entire image area, as well as the fact that the human eye is not disturbed by small luminance adjustments to such regions. Advantages of this invention include greatly improved image contrast, clearer appearance of images to the eye, reduced cost of noise and contouring artifacts incurred as a result of using transfer functions, and a strong reduction in non-uniform brightness changes during fade-ins and fade-outs in video streams.

Figure 1A:
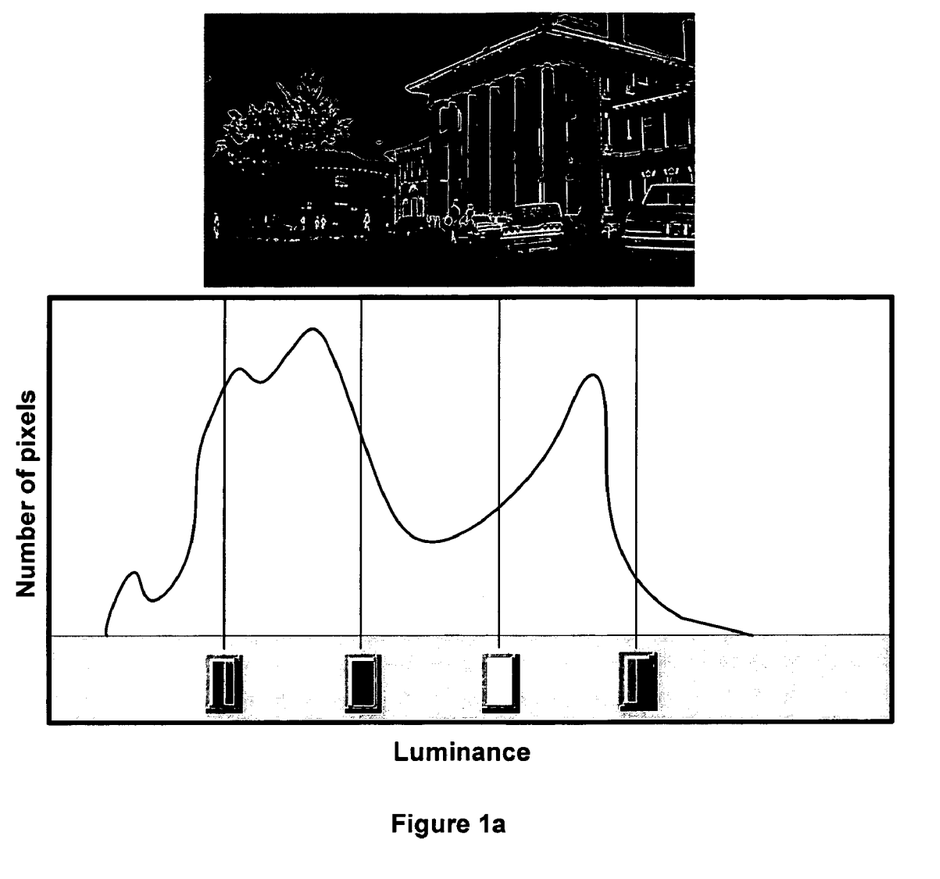
FIG. 1a shows an example medium-bright image and a histogram for the image, in accordance with an embodiment of the present invention.
Figure 1B:
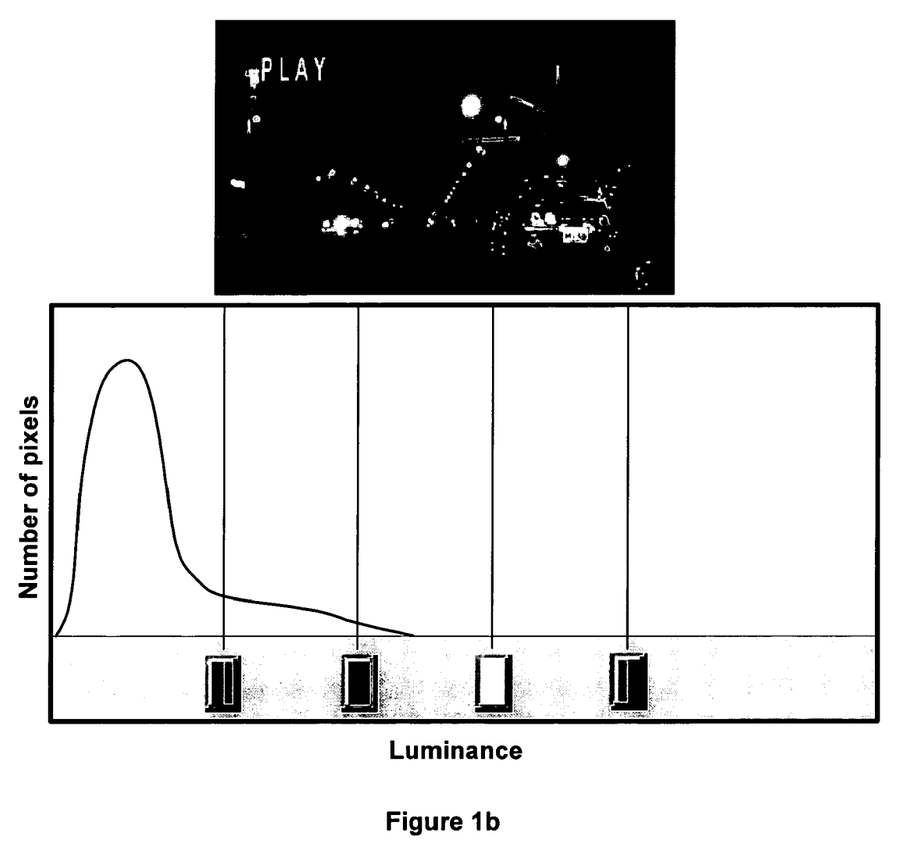
FIG. 1b shows an example dark (low-brightness) image and a histogram for the image, in accordance with an embodiment of the present invention.

FIG. 1a shows an example medium-bright image and a histogram for the image. FIG. 1b shows an example dark (low-brightness) image and a histogram for the image. In the shown histograms, the horizontal axis represents luminance values and the vertical axis represents the number of pixels having a given luminance value. For example, for the dark scene in FIG. 1b, the luminance histogram indicates that most of the pixels have low luminance, while for the medium-bright scene in FIG. 1a the luminance spectrum is wider, indicating a larger number of brighter pixels.

Figure 1C:
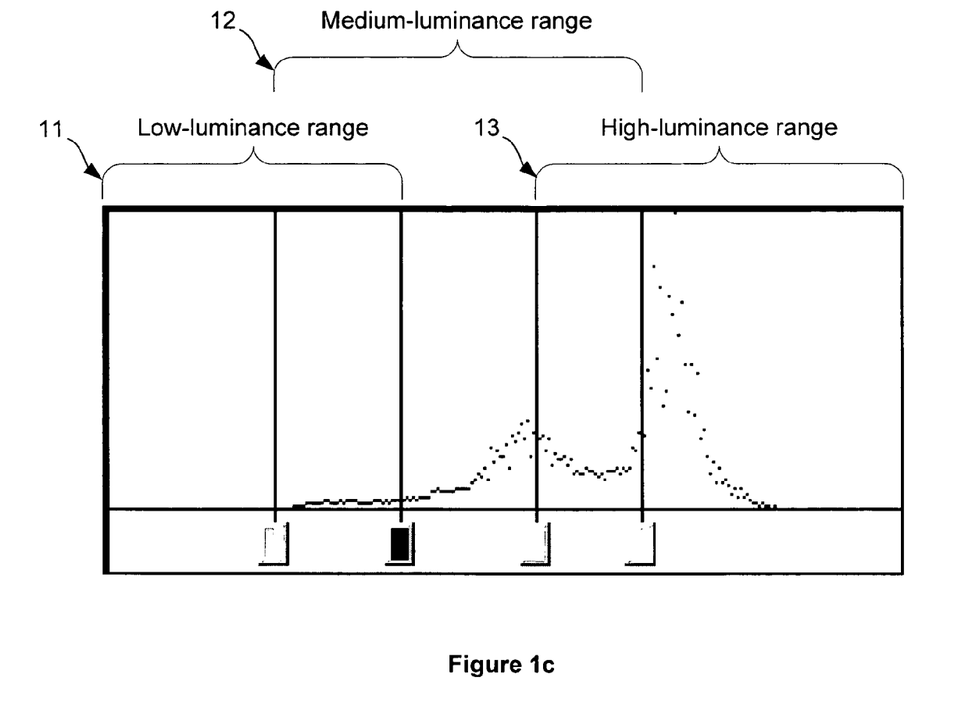
FIG. 1c shows three example luminance ranges, in accordance with an embodiment of the present invention.

In the following description, three luminance ranges are used to classify images: low-luminance, medium-luminance and high-luminance. FIG. 1c shows three example luminance ranges 11, 12 and 13, in accordance with an embodiment of the present invention. The luminance ranges are user-definable and may be chosen to overlap in order to provide for smooth contrast enhancement. By way of example, a low-luminance range of 0% to 40%, a medium-luminance range of 20% to 70%, and a high-luminance range of 60% to 100% luminance have been found to work well. Given a particular choice of luminance ranges, an image is then described as low-luminance (or low-brightness), medium-luminance (or medium-brightness) or high-luminance (or high-brightness) if "most" of the image pixels fall within the corresponding luminance range, wherein "most" is quantified by a pre-defined threshold fraction. By way of example, threshold fractions in the range of about 50% to 95% have been found to work well. For example, given a low-luminance range of 0% to 40% and a threshold fraction set to 70%, an image having at least 70% of its pixels in the 0% to 40% luminance range qualifies as a low-luminance image. Experimentation allows optimization of the luminance ranges and the threshold fraction for a particular universe of images to be enhanced.

Figure 2A:
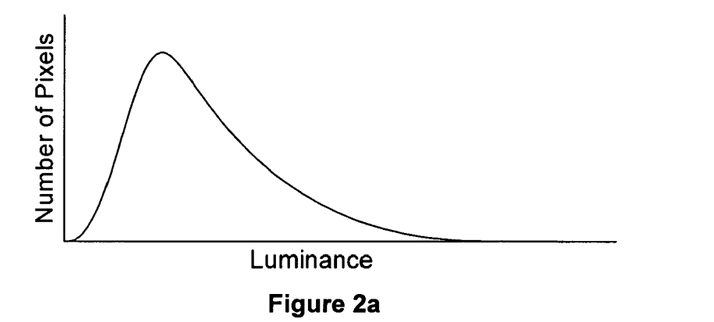
FIG. 2a shows a histogram for a dark image.
Figure 2B:
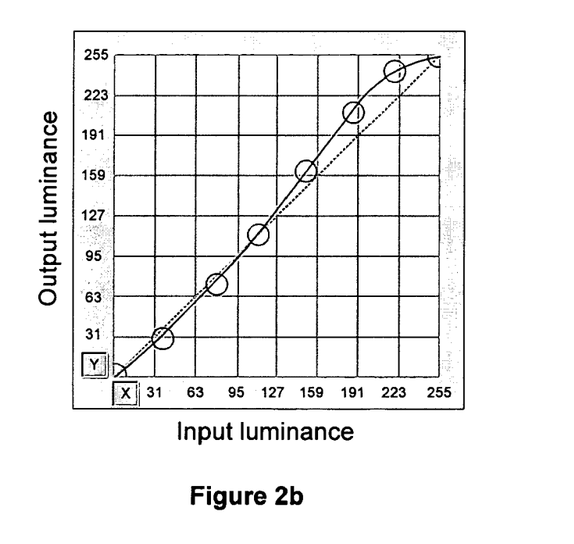
FIG. 2b shows a transfer curve for enhancing the contrast in such an image, in accordance with an embodiment of the present invention.

In accordance with one embodiment of the present invention, a histogram for a dark image is shown in FIG. 2a and a transfer curve for enhancing the contrast in such an image is shown in FIG. 2b. The histogram indicates that most of the pixels are in the low-luminance range. The transfer function increases luminance in the high-luminance regions of the image without substantially changing the luminance in the mid- and low-luminance regions of the image. The eye is not sensitive to a relatively small loss in detail in the bright areas of the picture resulting from such a luminance increase if these areas cumulatively comprise a relatively small fraction of the entire image, as is indicated by the small number of bright pixels in the histogram. The transfer curve does not substantially alter the luminance of the dark regions, since:

(a) Increasing the luminance in dark areas results in an image which would look as if observed through a "fog", indicating poor contrast;

(b) Decreasing the luminance in darker regions results in loss of detail in those regions, which is not acceptable in darker images, since the darker pixels often represent most of the relevant image content; and (c) Increasing the gain in the darker regions unnecessarily emphasizes the relatively small pixel value disturbances of the darker pixels (present in most images), amplifying the inherent noise in the image and resulting in a noisy and grainy image.

However, when the display in use comprises a backlight, such as in an LCD or a DLP (Digital Light Processor) based display, decreasing the luminance in the low-luminance regions (as shown in FIG. 2b) helps compensate for the backlight and deliver a more CRT-like image. When the display in use does not comprise backlight, such as in a CRT or plasma based display, there is less need for decreasing the luminance in the low-luminance regions, since in such displays dark regions are due to an absence of light and not created by a process which blocks the backlight (as in an LCD or DLP) and may leak some light in the process.

Figure 2C:
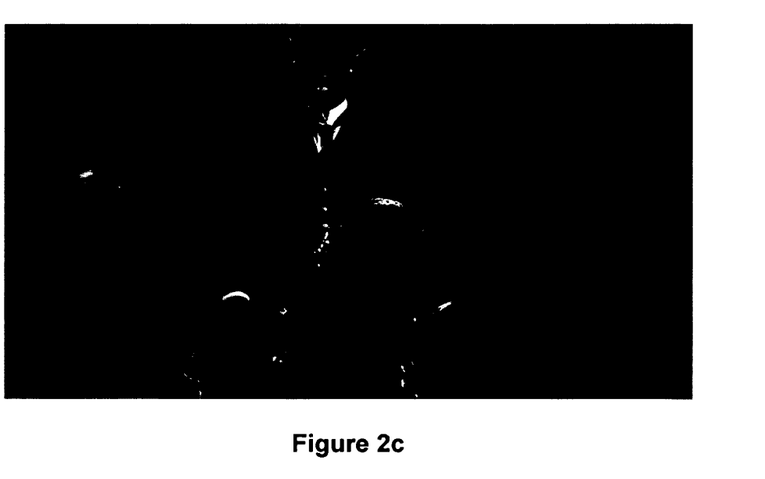
FIG. 2c is a low-luminance image showing two actors wearing dark suits and bright shirts, in accordance with an embodiment of the present invention.

By way of example, FIG. 2c is a low-luminance image showing two actors wearing dark suits and bright shirts. Note that while increasing the luminance of the relatively small number of bright pixels (such as the white collars which cumulatively comprise a small fraction of the overall image) may cause some loss in detail in those image areas (i.e. in the texture of the collars), the human eye perceives the reduced overall brightness together with the associated white-stretching as enhanced image contrast.

Figure 3A:
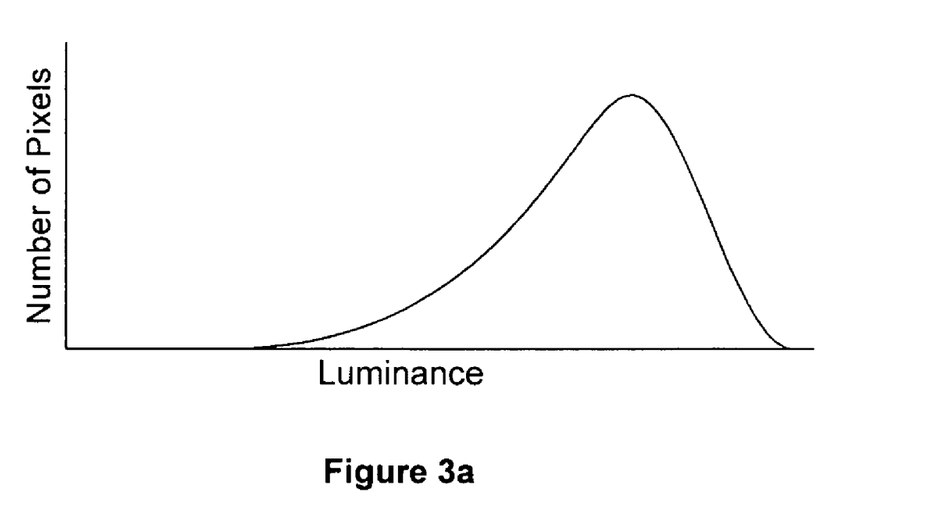
FIG. 3a shows a histogram for a bright image.
Figure 3B:
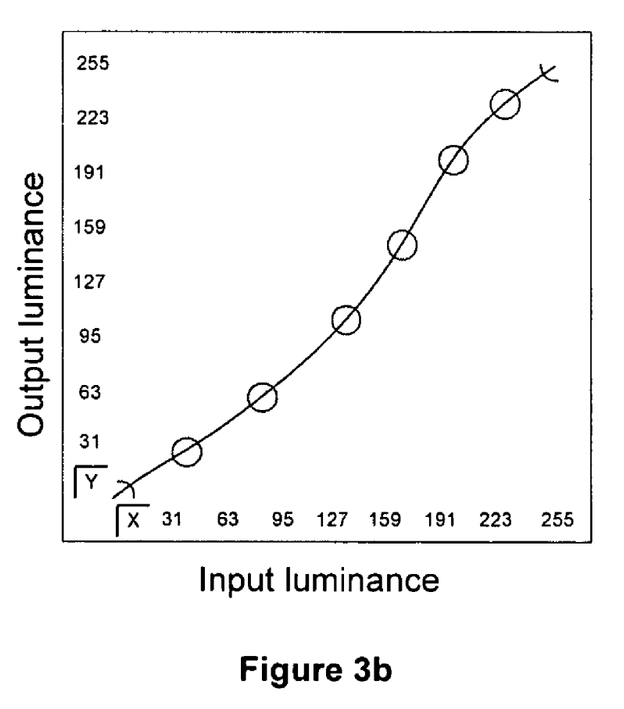
FIG. 3b shows a transfer curve for enhancing the contrast in such an image, in accordance with an embodiment of the present invention.

In accordance with another embodiment of the present invention, a histogram for a bright image is shown in FIG. 3a and a transfer curve for enhancing the contrast in such an image is shown in FIG. 3b. The histogram indicates that most of the image content falls within the high-luminance range of the histogram. Accordingly, the transfer function is set to decrease the luminance in the dark areas of the image without substantially changing the luminance in the mid- and high-luminance regions of the image. The eye is not sensitive to a relatively small loss in detail in the dark areas of the image if these areas cumulatively comprise a relatively small fraction of the entire image, as is indicated by the small number of dark pixels in the histogram. The transfer curve does not alter the luminance in the bright regions of the image, since:

(a) Decreasing the luminance is bright areas results in an image which is less appealing to the eye due to decreased overall image brightness;

(b) Increasing the luminance in bright areas results in loss of detail in those regions due to clipping, which is not acceptable in bright images, since the brighter pixels often represent most of the relevant image content; and (c) Increasing the gain in the brighter regions amplifies the inherent noise in the image and results in a noisy and grainy image.

By way of example, a bright image may depict a scene of a sporting event on ice (such as a hockey game) having players wearing uniforms with dark details. In such an image, details in the dark areas of the picture (e.g. the texture of the uniforms) are not as relevant to a viewer as is following the action of the game and the movement of the black puck. For such a bright image, a transfer function such as the one shown in FIG. 3b will decrease the luminance of the relatively small number of darker pixels (such as the puck, the dark details of the players' uniforms, the audience), thereby drawing the attention of the viewer towards those parts of the scene that are more relevant for visually following the movements. While such contrast enhancement may result in some loss of detail in the dark areas, overall the human eye perceives an enhanced image contrast.

For a medium-bright image, the technique is to increase the luminance in the high-luminance range and decrease the luminance in the low-luminance range of the image without substantially changing the luminance in the medium-luminance range of the image. Note that medium-bright images encompass a wide variety of luminance distributions, as shown in the example histograms of FIGS. 4a and 4c: The histogram of FIG. 4a has a larger variance and the histogram of FIG. 4c a smaller variance, even though both indicate medium-bright images. The present invention preferably distinguishes between such variances as follows.

Figure 4A:
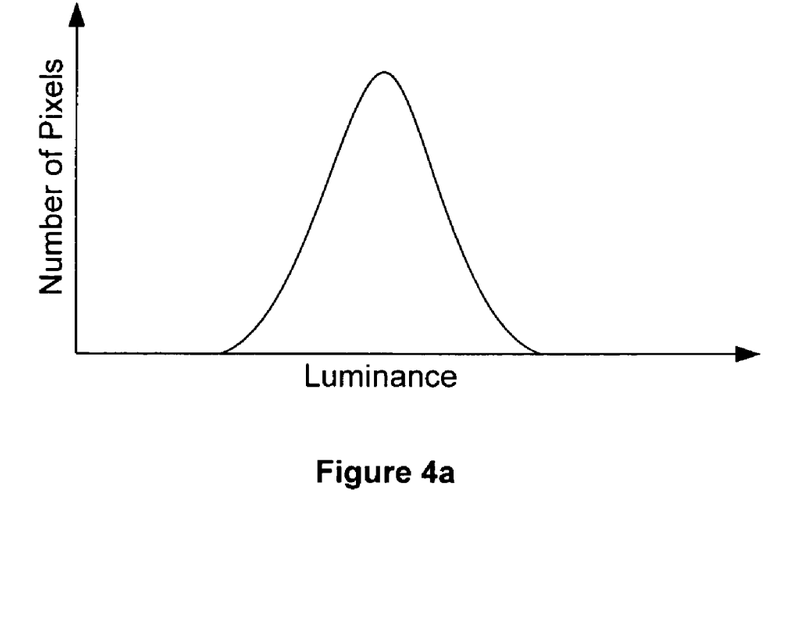
FIGS. 4a and 4c show histograms for medium-bright images.
Figure 4B:
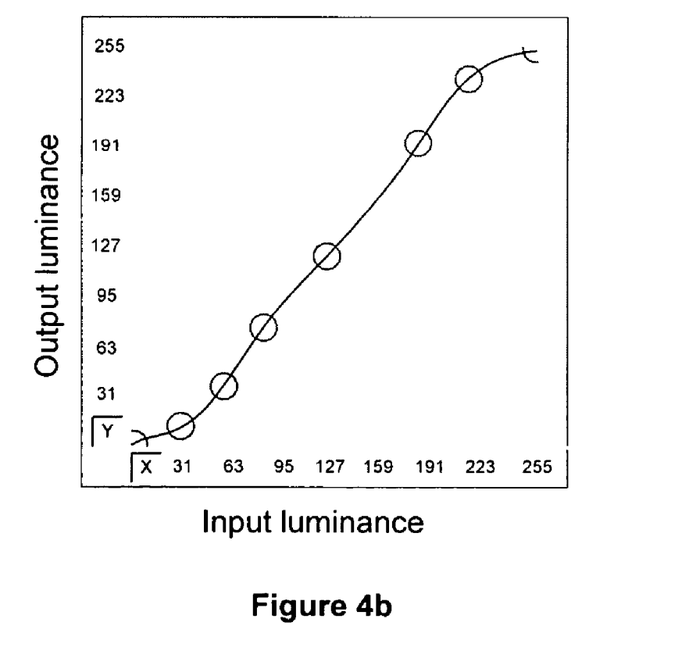
FIGS. 4b and 4d show corresponding transfer curves for enhancing the contrast in such images, in accordance with an embodiment of the present invention.

FIG. 4b is a transfer curve for enhancing the contrast of an image having a histogram as shown in FIG. 4a, according to an embodiment of the present invention. Since the histogram of FIG. 4a shows a concentration of pixel luminances in a relatively narrow range and therefore indicates that the dark and bright pixels collectively occupy a smaller total area, the transfer curve remains generally linear (i.e. has a slope of about 1 and represents an identity mapping) in the luminance range occupied by most pixels, while decreasing the luminance of the low-luminance pixels and increasing the luminance of the high-luminance pixels using "S" shaped curves on each end of the transfer curve. The result is an increase in the overall contrast and dynamic range of the image.

Figure 4C:
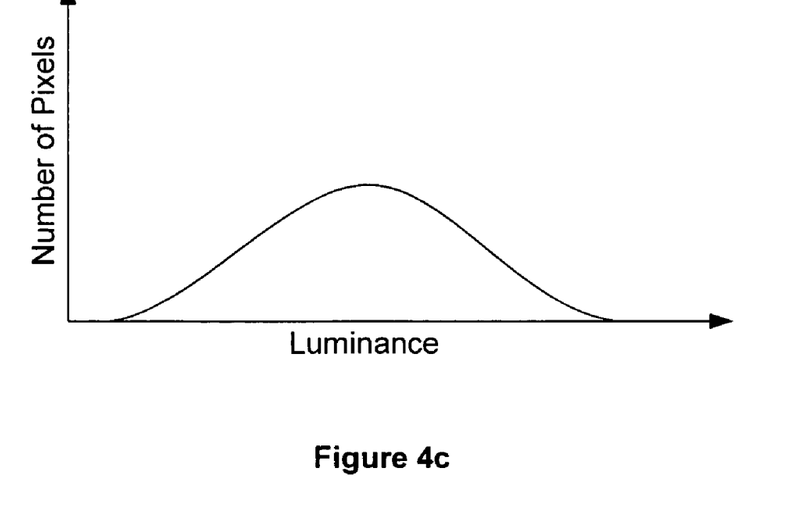
Figure 4D:
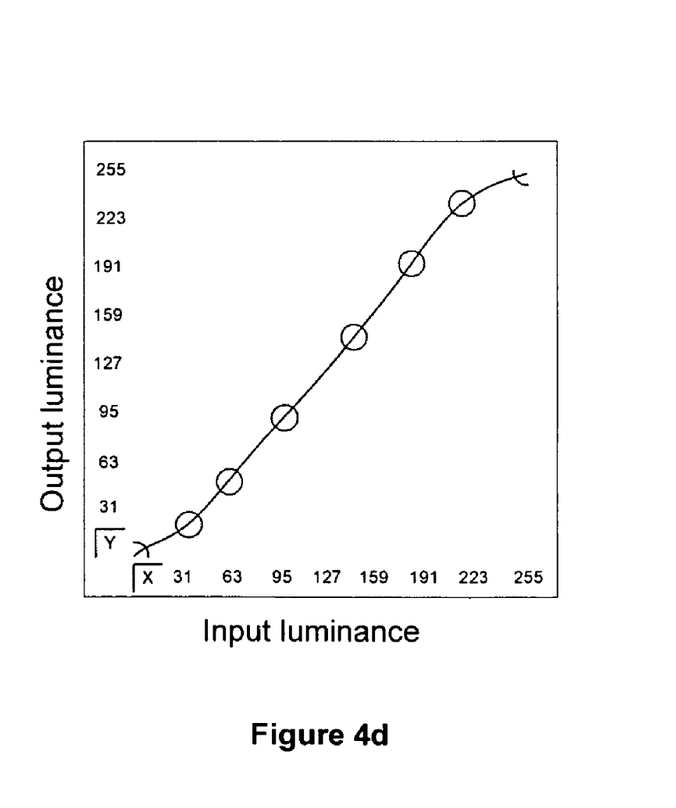

FIG. 4d is a transfer curve for enhancing the contrast of an image having a histogram as shown in FIG. 4c, according to an embodiment of the present invention. Compared to the previous case shown in FIGS. 4a and 4b, the histogram of FIG. 4c shows a spread of pixel luminances over a wider luminance range and therefore indicates that the dark and bright pixels collectively occupy a larger total area. Therefore, in contrast with the previous case, the transfer curve decreases the luminance of the low-luminance pixels and increases the luminance of the high-luminance pixels using slightly slimmer "S" curves at the ends of the transfer curve, and comprises a more even slope transition in the range between the two "S" curves. The result again is an increase in the overall contrast and dynamic range of the image.

Figure 5:
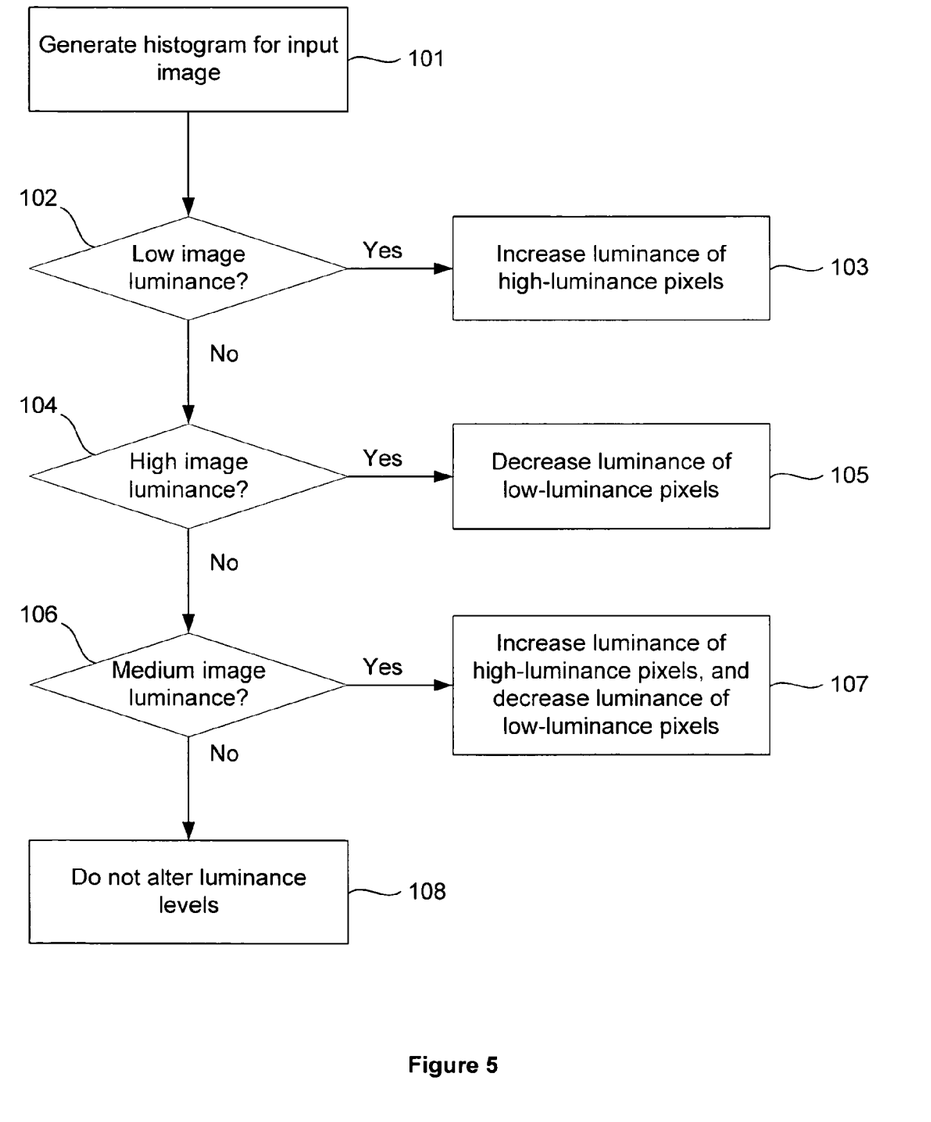
FIG. 5 is a flowchart illustrating a method of adaptively enhancing the contrast of an image, in accordance with an embodiment of the present invention.

FIG. 5 is a flowchart illustrating a method of adaptively enhancing the contrast of an image, in accordance with an embodiment of the present invention. First, a luminance histogram is constructed 101 for an input image. If the histogram indicates 102 that most of the pixels have low luminance, a transfer curve is used which increases 103 the luminance of high-luminance pixels in the image and does not substantially alter the mid- and low-luminance pixels in the image, such as the transfer curve shown in FIG. 2b. Else, if the histogram indicates 104 most of the pixels have high luminance, a transfer curve is used which decreases 105 the luminance of low-luminance pixels in the image and does not substantially alter the high- and mid-luminance pixels in the image, such as the transfer curve shown in FIG. 3b. Else, if the histogram indicates 106 that most of the pixels have a medium level of luminance, a transfer curve is used which increases 107 the luminance of high-luminance pixels, decreases the luminance of low-luminance pixels and does not substantially alter the luminance of the mid-luminance pixels in the image, such as the transfer curve shown in FIG. 4b. If the input image does not fall into of the three categories of low-, high- or medium-luminance, then the luminance levels of the input image pixels are not altered 108.

One advantageous aspect of the present invention is the greatly improved image contrast. While the average brightness of the output image may be slightly lower, output images appear clearer to the eye. Focusing on bright pixels in mostly dark images when increasing luminance allows for overcompensation of the bright pixels. While this may lead to a small loss of detail, confined to a relatively small image area represented by the small number of bright pixels, the result is an image with improved contrast. In most applications, and especially in moving images (such as a video stream), the loss of such detail is not noticeable to the eye and therefore can be traded off for improved image contrast. Similarly, a decrease in the luminance levels of darker pixels in a mostly bright image may lead to a small loss of detail, confined to the small area represented by the dark pixels, but the suppression of such dark pixels results in improved image contrast.

Another advantageous aspect of the present invention is the small cost of noise and contouring artifacts that are incurred as a result of using the above described transfer functions. While the techniques may result in some noise amplification and contouring artifacts, such side-effects are kept small due to the fact that the technique does not substantially alter the luminance of the most significantly represented pixel groups, i.e. the luminance of dark pixels in mostly dark images and the luminance of bright pixels in mostly bright images.

Another advantageous aspect of the present invention is a strong reduction in non-uniform brightness changes during fade-ins and fade-outs in video streams. This also is due to the fact that the technique does not substantially alter the luminance levels of dark pixels in mostly dark images and the luminance levels of bright pixels in mostly bright images.

For smooth contrast enhancement in a sequence of images (such as in a video stream), the transfer functions can be applied adaptively based on the image content of the most recent frames. One implementation of this technique comprises accumulating the histograms of the most recent set of frames and computing their average. Based on the resulting average histogram, an appropriate transfer function is chosen for contrast enhancement. When implementing such an averaging technique, a buffer of 5 to 15 frames has been found to work well.

The invention has been described in the context of displaying an image on a digital display device. It should be appreciated that the same techniques can be used to limit the adaptive contrast enhancement to a region in the display. By way of example, adaptive contrast enhancement for a movie may exclude the upper and lower black bands that run horizontally across the display. By way of another example, adaptive contrast enhancement may be restricted to a user-definable region of the display, such as a window or a physical region of the display.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

I claim:

1. A method for enhancing contrast of an image displayed on a display device comprising:
    receiving the image;
    selecting a transfer curve according to a luminance histogram of the image;
    enhancing the contrast of the image to produce an output image according to the transfer curve by,
        (a) increasing luminance levels for high-luminance pixels without substantially changing luminance levels for mid- and low-luminance pixels in the image only when the image comprises mostly low-luminance pixels;
        (b) decreasing luminance levels for low-luminance pixels without substantially changing luminance levels for mid- and high-luminance pixels in the image only when the image comprises mostly high-luminance pixels; and
        (c) increasing luminance levels for high-luminance pixels and decreases luminance levels for low-luminance pixels in the image without substantially changing luminance levels for mid-luminance pixels only when the image comprises mostly mid-luminance pixels; and
    displaying the output image on the display device.

2. A method as recited in claim 1, wherein the display device is selected from the group consisting of an LCD screen, an OLED screen, a DLP screen, a CRT and a plasma panel.

3. A method as recited in claim 1, wherein contrast enhancement is applied to a user-definable region in the display.

4. A method as recited in claim 1, further comprising generating the luminance histogram for the image.

5. A method as recited in claim 1, wherein the luminance ranges for low-, medium-, and high-luminance pixels are user-defined.

6. A method as recited in claim 1, wherein the luminance ranges for low-, medium-, and high-luminance pixels overlap in order to provide smooth contrast enhancement.

7. An apparatus for adaptive contrast enhancement, comprising:
   a display for displaying an output image; and
   a controller for:
   (a) receiving an image;
   (b) selecting a transfer curve according to a luminance histogram of the image;
   (c) enhancing a contrast of the image according to the transfer curve to produce the output image, the transfer curve for
     a. increasing luminance levels for high-luminance pixels without substantially changing luminance levels for medium- and low-luminance pixels in the image only when the image comprises mostly low-luminance pixels;
     b. decreasing luminance levels for low-luminance pixels without substantially changing luminance levels for medium- and high-luminance pixels in the image only when the image comprises mostly high-luminance pixels; and
     c. increasing luminance levels for high-luminance pixels and decreasing luminance levels for low-luminance pixels in the image without substantially changing luminance levels for medium-luminance pixels only when the image comprises mostly medium-luminance pixels;
   (d) providing the output image to the display for displaying.

8. An apparatus as recited in claim 7, the controller further for:
   (e) generating the luminance histogram of the image.

9. An apparatus as recited in claim 7, wherein the display is selected from the group consisting of an LCD screen, an OLED screen, a DLP screen, a CRT and a plasma panel.

10. An apparatus as recited in claim 7, wherein the luminance ranges for low-, medium-, and high-luminance pixels are user-defined.

11. An apparatus as recited in claim 7, wherein the luminance ranges for low-, medium-, and high-luminance pixels overlap in order to provide smooth contrast enhancement.

* * * * *

UNITED STATES PATENT AND TRADEMARK OFFICE
CERTIFICATE OF CORRECTION

PATENT NO.       : 7,573,533 B2
APPLICATION NO.  : 11/044774
DATED            : August 11, 2009
INVENTOR(S)      : Caba Moldvai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this

Fourteenth Day of December, 2010

David J. Kappos
*Director of the United States Patent and Trademark Office*